(12) United States Patent
Baba et al.

(10) Patent No.: US 11,512,458 B2
(45) Date of Patent: Nov. 29, 2022

(54) WET-AREA DEVICE AND METHOD FOR MANUFACTURING WET-AREA DEVICE

(71) Applicant: TOTO LTD., Kitakyushu (JP)

(72) Inventors: Tomoki Baba, Kitakyushu (JP); Satoshi Shimizu, Kitakyushu (JP); Takuma Kawasaki, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 0 days.

(21) Appl. No.: 17/001,897

(22) Filed: Aug. 25, 2020

(65) Prior Publication Data
US 2021/0164206 A1 Jun. 3, 2021

(30) Foreign Application Priority Data

Nov. 29, 2019 (JP) .............................. JP2019-216624
Jul. 8, 2020 (JP) .............................. JP2020-117791

(51) Int. Cl.
B24C 1/10 (2006.01)
B32B 15/00 (2006.01)
(Continued)

(52) U.S. Cl.
CPC ................. E03C 1/18 (2013.01); B24C 1/06 (2013.01); B24C 1/10 (2013.01); B32B 15/00 (2013.01); B32B 15/01 (2013.01); B32B 15/013 (2013.01); B32B 15/015 (2013.01); B32B 15/04 (2013.01); B32B 15/18 (2013.01); B32B 15/20 (2013.01); C23C 28/023 (2013.01); C23C 28/32 (2013.01); C23C 28/321 (2013.01); C23C 28/322 (2013.01); C23C 28/347 (2013.01); E03C 1/0404 (2013.01); B32B 2255/06 (2013.01); B32B 2255/20 (2013.01); B32B 2255/205 (2013.01); B32B 2255/28 (2013.01); B32B 2307/538 (2013.01); C23F 17/00 (2013.01); Y10T 29/479 (2015.01); Y10T 29/497 (2015.01); Y10T 428/31678 (2015.04)

(58) Field of Classification Search
None
See application file for complete search history.

(56) References Cited

U.S. PATENT DOCUMENTS

2008/0115267 A1* 5/2008 Konno ...................... E03C 1/18
4/679
2015/0361562 A1* 12/2015 Abe ...................... C23C 28/044
428/446

FOREIGN PATENT DOCUMENTS

| CN | 101094767 A | 12/2007 |
|---|---|---|
| JP | 2007-237541 A | 9/2007 |
| JP | 2008-106487 A | 5/2008 |

* cited by examiner

Primary Examiner — Adam Krupicka
(74) Attorney, Agent, or Firm — Pearne & Gordon LLP

(57) ABSTRACT

According to one embodiment, a wet-area device includes a main part, a first layer, and a second layer. The first layer is provided on an outer surface of the main part. The second layer is provided on an outer surface of the first layer. A hardness of the second layer is greater than a hardness of the first layer. The first layer includes a first unevenness at a side of the outer surface of the first layer. The first unevenness includes a plurality of recesses and a plurality of protrusions. The second layer includes a second unevenness at a side of an outer surface of the second layer. The second unevenness includes a plurality of recesses and a plurality of protrusions. The second unevenness is arranged along the first unevenness. An average height of the first unevenness is less than an average length of the first unevenness.

9 Claims, 6 Drawing Sheets

(51) Int. Cl.
*E03C 1/18* (2006.01)
*C23C 28/00* (2006.01)
*B24C 1/06* (2006.01)
*C23C 28/02* (2006.01)
*B32B 15/18* (2006.01)
*B32B 15/01* (2006.01)
*B32B 15/04* (2006.01)
*E03C 1/04* (2006.01)
*B32B 15/20* (2006.01)
*C23F 17/00* (2006.01)

| SAMPLE | FIRST UNEVENNESS | | | | APPEARANCE |
|---|---|---|---|---|---|
| | Rc1 | RSm1 | Rc1/RSm1 | GLOSSINESS | |
| 1 | 0.6 | 117 | 0.005 | 463 | ×NON-MATTE |
| 2 | 1.0 | 117 | 0.009 | 351 | |
| 3 | 1.2 | 106 | 0.011 | 306 | |
| 4 | 1.3 | 93 | 0.014 | 213 | |
| 5 | 1.5 | 99 | 0.015 | 203 | ○GLOSSY-MATTE |
| 6 | 2.0 | 91 | 0.022 | 140 | |
| 7 | 2.2 | 108 | 0.020 | 135 | |
| 8 | 2.6 | 110 | 0.024 | 127 | |
| 9 | 3.1 | 106 | 0.029 | 71 | |
| 10 | 4.3 | 116 | 0.037 | 47 | |
| 11 | 4.8 | 123 | 0.039 | 41 | |
| 12 | 5.7 | 126 | 0.045 | 33 | ×NON-GLOSSY MATTE |
| 13 | 5.5 | 117 | 0.047 | 29 | |
| 14 | 6.3 | 121 | 0.052 | 35 | |
| 15 | 7.5 | 134 | 0.056 | 22 | |
| 16 | 5.0 | 61 | 0.082 | 13 | |

FIG. 7

| SAMPLE | SECOND UNEVENNESS | | | | APPEARANCE |
|---|---|---|---|---|---|
| | Rc2 | RSm2 | Rc2/RSm2 | GLOSSINESS | |
| 1 | 0.6 | 120 | 0.005 | 145.000 | ×NON-MATTE |
| 2 | 0.9 | 114 | 0.008 | 86.000 | |
| 3 | 1.2 | 88 | 0.014 | 68.000 | |
| 4 | 1.5 | 97 | 0.015 | 42.000 | |
| 5 | 1.4 | 88 | 0.016 | 36.600 | ○GLOSSY-MATTE |
| 6 | 2.0 | 105 | 0.019 | 29.000 | |
| 7 | 2.2 | 96 | 0.023 | 26.900 | |
| 8 | 2.3 | 102 | 0.023 | 17.000 | |
| 9 | 3.6 | 123 | 0.029 | 11.800 | |
| 10 | 3.6 | 108 | 0.034 | 9.000 | |
| 11 | 4.8 | 126 | 0.038 | 8.000 | |
| 12 | 6.2 | 136 | 0.046 | 5.100 | ×NON-GLOSSY MATTE |
| 13 | 5.3 | 104 | 0.051 | 4.000 | |
| 14 | 4.9 | 98 | 0.050 | 2.000 | |
| 15 | 6.7 | 112 | 0.060 | 1.300 | |
| 16 | 4.5 | 50 | 0.090 | 1.000 | |

FIG. 8

WET-AREA DEVICE AND METHOD FOR MANUFACTURING WET-AREA DEVICE

CROSS-REFERENCE TO RELATED APPLICATIONS

This application is based upon and claims the benefit of priority from Japanese Patent Application No. 2019-216624, filed on Nov. 29, 2019 and No. 2020-117791, filed on Jul. 8, 2020; the entire contents of which are incorporated herein by reference.

FIELD

Embodiments described herein relate generally to a wet-area device and a method for manufacturing a wet-area device.

BACKGROUND

Metal plating on the outer surface of a main part for ensuring the strength of a wet-area device such as a faucet apparatus or the like is known (e.g., JP-A 2008-106487). The outer surface of such a wet-area device has a highly glossy appearance due to the plating when struck by light.

On the other hand, matting of the outer surface of a plated wet-area device for suppressing the glossy appearance of the outer surface is known. For example, such matting is performed by forming a fine unevenness in the outer surface of the wet-area device (the plating) by shot blasting, etc.

However, when matting is performed by shot blasting or the like, there are cases where the height (the depth) of the unevenness formed in the outer surface of the wet-area device undesirably becomes too large. When the height of the unevenness formed in the outer surface of the wet-area device is too large, it is difficult to remove the water that collects in the unevenness, and the adhesion of grime to the outer surface of the wet-area device easily becomes a problem.

SUMMARY

According to the embodiment, a wet-area device includes a main part, a first layer, and a second layer. The main part is made of metal. The first layer is provided on an outer surface of the main part. The second layer is provided on an outer surface of the first layer. A hardness of the second layer is greater than a hardness of the first layer. The first layer includes a first unevenness at a side of the outer surface of the first layer. The first unevenness includes a plurality of first recesses and a plurality of first protrusions. The second layer includes a second unevenness at a side of an outer surface of the second layer. The second unevenness includes a plurality of second recesses and a plurality of second protrusions. The second unevenness is arranged along the first unevenness. An average height of the first unevenness is less than an average length of the first unevenness.

BRIEF DESCRIPTION OF THE DRAWINGS

FIG. 7 is a table illustrating the experiment results; and

FIG. 8 is a table illustrating the experiment results.

DETAILED DESCRIPTION

Figure 1:
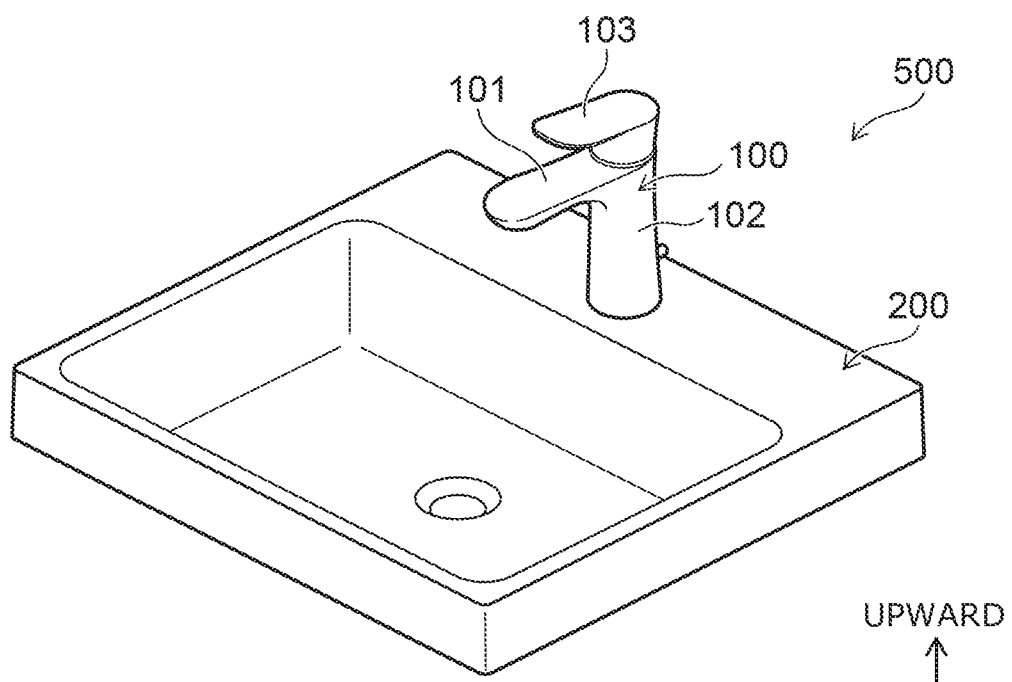
FIG. 1 is a perspective view schematically illustrating a wet-area equipment including a wet-area device according to the embodiment.

A first invention is a wet-area device including a main part made of metal, a first layer provided on an outer surface of the main part, and a second layer provided on an outer surface of the first layer; a hardness of the second layer is greater than a hardness of the first layer; the first layer includes a first unevenness, which includes multiple first recesses and multiple first protrusions, at a side of the outer surface of the first layer; the second layer includes a second unevenness, which includes multiple second recesses and multiple second protrusions, arranged along the first unevenness at a side of an outer surface of the second layer; and an average height of the first unevenness is less than an average length of the first unevenness.

According to this wet-area device, the glossy appearance of the outer surface of the wet-area device can be matted so as not to be too glossy because the first layer includes the first unevenness, and the second layer includes the second unevenness along the first unevenness. By setting the average height of the first unevenness to be less than the average length of the first unevenness, the glossy appearance of the outer surface of the wet-area device can be matted to be not too glossy, and the height of the unevenness of the outer surface of the wet-area device can be prevented from becoming too large. Thereby, the adhesion of grime due to the unevenness can be suppressed while suppressing the glossy appearance of the outer surface by matting.

A second invention is the wet-area device of the first invention, wherein the average height of the first unevenness is greater than 1 μm, and a ratio of the average height of the first unevenness to the average length of the first unevenness is greater than 0.01 and less than 0.05.

According to this wet-area device, by setting the average height of the first unevenness to be in this range, the height of the unevenness of the outer surface of the wet-area device can be prevented from becoming too large or too small. Thereby, a moderate glossy appearance (gloss) can remain while suppressing the glossy appearance of the outer surface by matting.

A third invention is the wet-area device of the second invention, wherein the ratio of the average height of the first unevenness to the average length of the first unevenness is greater than 0.014 and less than 0.045.

According to this wet-area device, by setting the ratio of the average height of the first unevenness to the average length of the first unevenness to be in this range, the height of the unevenness of the outer surface of the wet-area device can be further prevented from becoming too large or too small. Thereby, an appearance that is both glossy and matte can be realized at the outer surface of the wet-area device.

A fourth invention is the wet-area device of the third invention, wherein the ratio of the average height of the first unevenness to the average length of the first unevenness is not less than 0.015 and not more than 0.039.

According to this wet-area device, by setting the ratio of the average height of the first unevenness to the average length of the first unevenness to be in this range, the height of the unevenness of the outer surface of the wet-area device can be further prevented from becoming too large or too small. Thereby, an appearance that is both glossy and matte can be realized at the outer surface of the wet-area device.

A fifth invention is the wet-area device of any one of the first to fourth inventions, wherein an average height of the second unevenness is greater than 1 μm, and a ratio of the average height of the second unevenness to an average length of the second unevenness is greater than 0.01 and less than 0.05.

According to this wet-area device, by setting the average height of the second unevenness to be in this range, the height of the unevenness of the outer surface of the wet-area device can be prevented from becoming too large or too small. Thereby, a moderate glossy appearance (gloss) can remain while suppressing the glossy appearance of the outer surface by matting.

A sixth invention is the wet-area device of the fifth invention, wherein the ratio of the average height of the second unevenness to the average length of the second unevenness is greater than 0.015 and less than 0.046.

According to this wet-area device, by setting the ratio of the average height of the second unevenness to the average length of the second unevenness to be in this range, the height of the unevenness of the outer surface of the wet-area device can be further prevented from becoming too large or too small. Thereby, an appearance that is both glossy and matte can be realized at the outer surface of the wet-area device.

A seventh invention is the wet-area device of a sixth invention, wherein the ratio of the average height of the second unevenness to the average length of the second unevenness is not less than 0.016 and not more than 0.038.

According to this wet-area device, by setting the ratio of the average height of the second unevenness to the average length of the second unevenness to be in this range, the height of the unevenness of the outer surface of the wet-area device can be further prevented from becoming too large or too small. Thereby, an appearance that is both glossy and matte can be realized at the outer surface of the wet-area device.

An eighth invention is the wet-area device of any one of the first to seventh inventions, wherein a thickness of the second layer is less than a thickness of the first layer.

According to this wet-area device, by setting the thickness of the second layer to be less than the thickness of the first layer, the second unevenness can be formed better along the first unevenness. Thereby, it is easy to adjust the glossy appearance of the outer surface in a moderate range.

A ninth invention is the wet-area device of the eighth invention, wherein the average height of the first unevenness is greater than the thickness of the second layer.

According to this wet-area device, by setting the average height of the first unevenness to be greater than the thickness of the second layer, the second unevenness can be formed better along the first unevenness. Thereby, it is easy to adjust the glossy appearance of the outer surface in a moderate range.

A tenth invention is a method for manufacturing the wet-area device of the first invention, including a first layer formation process of forming the first layer on the outer surface of a main part made of metal, an unevenness formation process of forming the first unevenness including the multiple first recesses and the multiple first protrusions at the side of the outer surface of the first layer by shot blasting the outer surface of the first layer, and a second layer formation process of forming the second layer having a higher hardness than the first layer on the outer surface of the first layer where the first unevenness is formed; an average height of the first unevenness is less than an average length of the first unevenness in the unevenness formation process; and the second layer formation process forms the second layer so that the second unevenness includes the multiple second recesses and the multiple second protrusions and is arranged along the first unevenness at the side of the outer surface of the second layer.

According to the method for manufacturing the wet-area device, by forming the first unevenness in the first layer and by forming the second unevenness along the first unevenness in the second layer, the glossy appearance of the outer surface of the wet-area device can be matted so as not to be too glossy. Also, by setting the average height of the first unevenness to be less than the average length of the first unevenness, the glossy appearance of the outer surface of the wet-area device can be matted so as not to be too glossy, and the height of the unevenness of the outer surface of the wet-area device can be prevented from becoming too large. Thereby, a wet-area device can be provided in which the adhesion of grime due to the unevenness can be suppressed while suppressing the glossy appearance of the outer surface by matting.

Embodiments of the invention will now be described with reference to the drawings. Similar components in the drawings are marked with the same reference numerals, and a detailed description is omitted as appropriate.

FIG. 1 is a perspective view schematically illustrating a wet-area equipment including a wet-area device according to the embodiment.

As illustrated in FIG. 1, the wet-area equipment 500 according to the embodiment includes the wet-area device 100 and a bowl 200. The wet-area device 100 is, for example, a device including a flow channel inside which water flows. The wet-area device 100 may be a device that is used at the periphery of a device including a flow channel inside which water flows and has a possibility of being contacted by water.

In the example, the wet-area device 100 is a faucet apparatus. The wet-area device 100 includes a water discharger 101, a supporter 102, and an operation part 103. The water discharger 101 discharges water toward the bowl 200 positioned below the water discharger 101. The supporter 102 is provided below the water discharger 101. The supporter 102 is fixed to the upper surface of the bowl 200 at the lower end of the supporter 102 and supports the water discharger 101. A flow channel in which water flows is provided inside the water discharger 101 and the supporter 102. The operation part 103 is a lever provided above the water discharger 101. By operating the operation part 103, a user can discharge and stop the discharge of water from the water discharger 101, perform a temperature regulation and/or a flow regulation of the discharged water, etc.

The wet-area device 100 is not limited to a faucet apparatus and may be, for example, a drainage metal fitting mounted to the bowl 200, a handrail provided in a bath room, a toilet paper holder provided for a toilet, a handle provided in a kitchen, etc.

Figure 2:
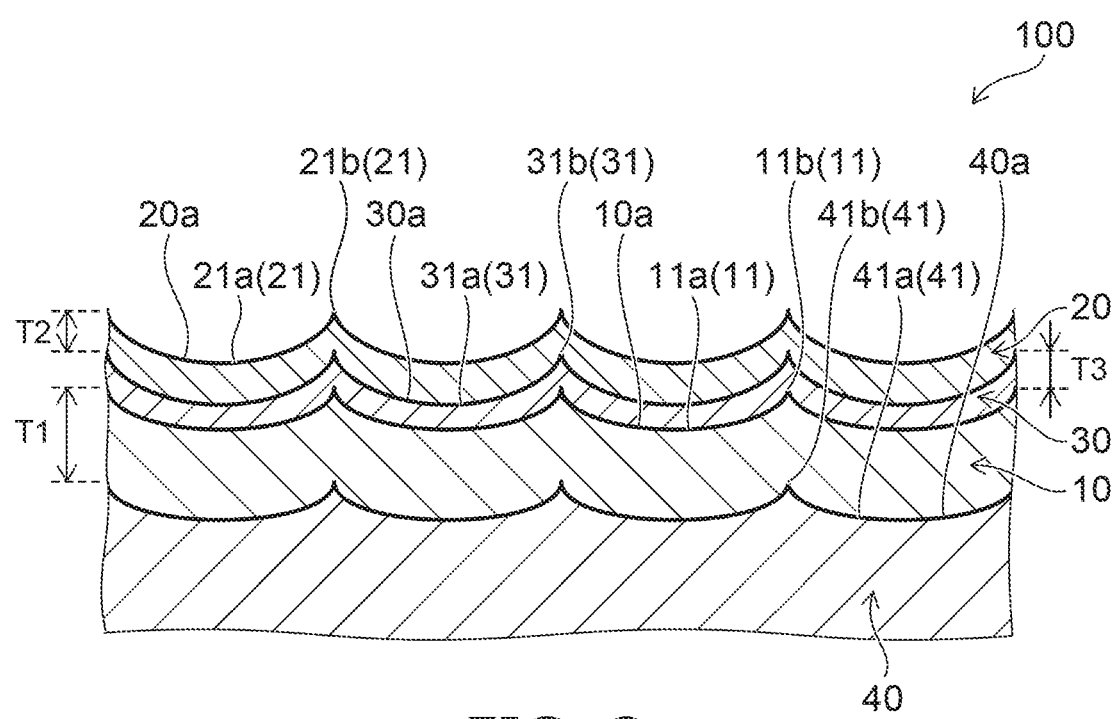
FIG. 2 is a cross-sectional view schematically illustrating the outer surface vicinity of the wet-area device according to the embodiment.

FIG. 2 is a cross-sectional view schematically illustrating the outer surface vicinity of the wet-area device according to the embodiment.

As illustrated in FIG. 2, the wet-area device 100 includes a main part 40, a first layer 10, a second layer 20, and a third layer 30.

The main part 40 is made of metal. The main part 40 includes, for example, a copper alloy such as brass or the like, stainless steel, etc. The main part 40 may include, for example, copper plating on the outer surface of a base made of zinc.

The first layer 10 is provided on an outer surface 40a of the main part 40. In other words, the first layer 10 is provided outward of the outer surface 40a of the main part 40.

The first layer 10 may be directly provided on the outer surface 40a of the main part 40 or may be indirectly provided on the outer surface 40a of the main part 40 with another layer interposed. That is, the first layer 10 may contact the outer surface 40a of the main part 40 or may not contact the outer surface 40a of the main part 40. In the example, the first layer 10 contacts the outer surface 40a of the main part 40.

For example, the first layer 10 is made of metal. The first layer 10 includes, for example, nickel, copper, etc. The corrosion resistance of the wet-area device 100 can be improved by providing the first layer 10.

The first layer 10 includes a first unevenness 11 in an outer surface 10a side. The first unevenness 11 is provided at a side of the outer surface 10a of the first layer 10. The first unevenness 11 includes multiple recesses 11a (first recesses) and multiple protrusions 11b (first protrusions). The recesses 11a of the first unevenness 11 are recessed in the stacking direction. The protrusions 11b of the first unevenness 11 protrude in the stacking direction. Here, the "stacking direction" is a direction connecting the main part 40 and the first layer 10. That is, the stacking direction is a direction orthogonal to the outer surface 10a of the first layer 10.

The second layer 20 is provided on the outer surface 10a of the first layer 10. In other words, the second layer 20 is provided outward of the outer surface 10a of the first layer 10. The second layer 20 is stacked in the same direction as the first layer 10. That is, the first layer 10 is positioned between the main part 40 and the second layer 20 in the stacking direction. For example, the second layer 20 is positioned at the outermost surface.

The second layer 20 may be directly provided on the outer surface 10a of the first layer 10 or may be indirectly provided on the outer surface 10a of the first layer 10 with another layer (e.g., the third layer 30) interposed. That is, the second layer 20 may contact the outer surface 10a of the first layer 10 or may not contact the outer surface 10a of the first layer 10. In the example, the second layer 20 does not contact the outer surface 10a of the first layer 10.

For example, the second layer 20 is made of metal. The second layer 20 includes, for example, chromium carbonitride, chrome, nickel, a tin-cobalt alloy, gold, etc. The hardness of the second layer 20 is greater than the hardness of the first layer 10. For example, the hardness of the first layer 10 and the hardness of the second layer 20 can be measured by a measurement method conforming to JIS Z 2244:2009. When the second layer 20 includes chromium carbonitride, the second layer 20 is, for example, black. In such a case, for example, the outer surface of the wet-area device 100 can be colored by providing the second layer 20. In other words, in such a case, for example, the second layer 20 functions as a colored layer. When the second layer 20 includes chrome, nickel, a tin-cobalt alloy, gold, etc., the wear resistance of the wet-area device 100 can be improved by providing the second layer 20, and the outer surface of the wet-area device 100 can be provided with metallic luster.

The second layer 20 includes a second unevenness 21 in an outer surface 20a side. The second unevenness 21 is provided at a side of the outer surface 20a of the second layer 20. The second unevenness 21 includes multiple recesses 21a (second recesses) and multiple protrusions 21b (second protrusions). The recesses 21a of the second unevenness 21 are recessed in the stacking direction. The protrusions 21b of the second unevenness 21 protrude in the stacking direction.

The second unevenness 21 is formed along the first unevenness 11. The second unevenness 21 is arranged along the first unevenness 11. In other words, the second unevenness 21 follows the first unevenness 11. That is, the recesses 21a of the second unevenness 21 overlap the recesses 11a of the first unevenness 11 in the stacking direction. Also, the protrusions 21b of the second unevenness 21 overlap the protrusions 11b of the first unevenness 11 in the stacking direction.

Thus, because the first layer 10 includes the first unevenness 11 and because the second layer 20 includes the second unevenness 21 along the first unevenness 11, the glossy appearance of the outer surface of the wet-area device 100 can be matted so as not to be too glossy.

The third layer 30 is provided between the first layer 10 and the second layer 20 in the stacking direction. That is, the third layer 30 is provided on the outer surface 10a of the first layer 10 and under the outer surface 20a of the second layer 20. In other words, the third layer 30 is provided outward of the outer surface 10a of the first layer 10 and inward of the outer surface 20a of the second layer 20. The third layer 30 is stacked in the same direction as the first layer 10 and the second layer 20.

When the third layer 30 is provided, the third layer 30 may be directly provided on the outer surface 10a of the first layer 10 or may be indirectly provided on the outer surface 10a of the first layer 10 with another layer interposed. That is, the third layer 30 may contact the outer surface 10a of the first layer 10 or may not contact the outer surface 10a of the first layer 10. In the example, the third layer 30 contacts the outer surface 10a of the first layer 10.

When the third layer 30 is provided, the second layer 20 may be directly provided on an outer surface 30a of the third layer 30 or may be indirectly provided on the outer surface 30a of the third layer 30 with another layer interposed. That is, the second layer 20 may contact the outer surface 30a of the third layer 30 or may not contact the outer surface 30a of the third layer 30. In the example, the second layer 20 contacts the outer surface 30a of the third layer 30.

For example, the third layer 30 is made of metal. The third layer 30 includes, for example, chrome, nickel, a tin-cobalt alloy, gold, etc. By providing the third layer 30, the wear resistance of the wet-area device 100 can be improved, and the outer surface of the wet-area device 100 can be provided with metallic luster. The third layer 30 is provided as necessary and is omissible.

The third layer 30 includes a third unevenness 31 in the outer surface 30a side. The third unevenness 31 is provided at a side of the outer surface 30a of the third layer 30. The third unevenness 31 includes multiple recesses 31a (third recesses) and multiple protrusions 31b (third protrusions). The recesses 31a of the third unevenness 31 are recessed in the stacking direction. The protrusions 31b of the third unevenness 31 protrude in the stacking direction.

The third unevenness 31 is formed along the first unevenness 11. The third unevenness 31 is arranged along the first unevenness 11. In other words, the third unevenness 31 follows the first unevenness 11. That is, the recesses 31a of the third unevenness 31 overlap the recesses 11a of the first unevenness 11 in the stacking direction. Also, the protrusions 31b of the third unevenness 31 overlap the protrusions 11b of the first unevenness 11 in the stacking direction.

Thus, when the third layer 30 is provided, the second layer 20 (the second unevenness 21) can reflect the first unevenness 11 via the third unevenness 31 because the third layer 30 includes the third unevenness 31 along the first unevenness 11; therefore, the adhesion of grime due to the unevenness can be suppressed while suppressing the glossy appearance of the outer surface by matting.

In the example, the main part 40 includes a main part unevenness 41 in the outer surface 40a side. The main part unevenness 41 is provided at a side of the outer surface 40a of the main part 40. The main part unevenness 41 includes multiple recesses 41a (main part recesses) and multiple protrusions 41b (main part protrusions). The recesses 41a of the main part unevenness 41 are recessed in the stacking direction. The protrusions 41b of the main part unevenness 41 protrude in the stacking direction.

The main part unevenness 41 is formed along the first unevenness 11. The main part unevenness 41 is arranged along the first unevenness 11. In other words, the main part unevenness 41 follows the first unevenness 11. That is, the recesses 41a of the main part unevenness 41 overlap the recesses 11a of the first unevenness 11 in the stacking direction. Also, the protrusions 41b of the main part unevenness 41 overlap the protrusions 11b of the first unevenness 11 in the stacking direction.

The main part 40 may not include the main part unevenness 41. That is, the outer surface 40a of the main part 40 may be planar.

A thickness T2 of the second layer 20 is, for example, less than a thickness T1 of the first layer 10. Thus, the second unevenness 21 can be formed better along the first unevenness 11 by setting the thickness T2 of the second layer 20 to be less than the thickness T1 of the first layer 10. Thereby, it is easy to adjust the glossy appearance of the outer surface in a moderate range.

A thickness T3 of the third layer 30 is, for example, less than the thickness T2 of the second layer 20. The thickness T1 of the first layer 10 is, for example, greater than the thickness T3 of the third layer 30.

More specifically, the thickness T1 of the first layer 10 is, for example, not less than 2 μm and not more than 30 μm. The thickness T2 of the second layer 20 is, for example, not less than 0.1 μm and not more than 3.0 μm (e.g., about 1 μm). The thickness T3 of the third layer 30 is, for example, not less than 0.1 μm and not more than 2.0 μm (e.g., about 0.5 μm).

Here, "thickness" is the length in the stacking direction. For example, the thickness can be calculated as the average value of lengths in the stacking direction at multiple locations in a cross-sectional image obtained with a scanning electron microscope (SEM).

It is sufficient for the first layer 10 to be provided on at least a portion of the outer surface 40a of the main part 40, and it is favorable to be provided on the entire surface of the outer surface 40a of the main part 40. Also, it is sufficient for the second layer 20 to be provided on at least a portion of the outer surface 10a of the first layer 10, and it is favorable to be provided on the entire surface of the outer surface 10a of the first layer 10. When the third layer 30 is provided, it is sufficient for the third layer 30 to be provided on at least a portion of the outer surface 10a of the first layer 10, and it is favorable to be provided on the entire surface of the outer surface 10a of the first layer 10.

It is sufficient for the first unevenness 11 to be provided in at least a portion of the outer surface 10a side of the first layer 10, and it is favorable to be provided in the entire surface on the outer surface 10a side of the first layer 10. Also, it is sufficient for the second unevenness 21 to be provided in at least a portion of the outer surface 20a side of the second layer 20, and it is favorable to be provided in the entire surface on the outer surface 20a side of the second layer 20. When the third layer 30 is provided, it is sufficient for the third unevenness 31 to be provided in at least a portion of the outer surface 30a side of the third layer 30, and it is favorable to be provided in the entire surface on the outer surface 30a side of the third layer 30. When the main part unevenness 41 is provided in the main part 40, it is sufficient for the main part unevenness 41 to be provided in at least a portion of the outer surface 40a side of the main part 40, and it is favorable to be provided in the entire surface on the outer surface 40a side of the main part 40.

In the embodiment, a layer that includes chrome, nickel, a tin-cobalt alloy, gold, etc., also may be provided between the first layer 10 and the third layer 30 and/or between the third layer 30 and the second layer 20. Even when such a layer is provided, by forming an unevenness in the outer surface side of this layer along the unevenness of the layer therebelow, the layer above this layer can reflect the first unevenness 11 via the unevenness of this layer.

The unevenness of each component will now be described in more detail.

Figure 3:
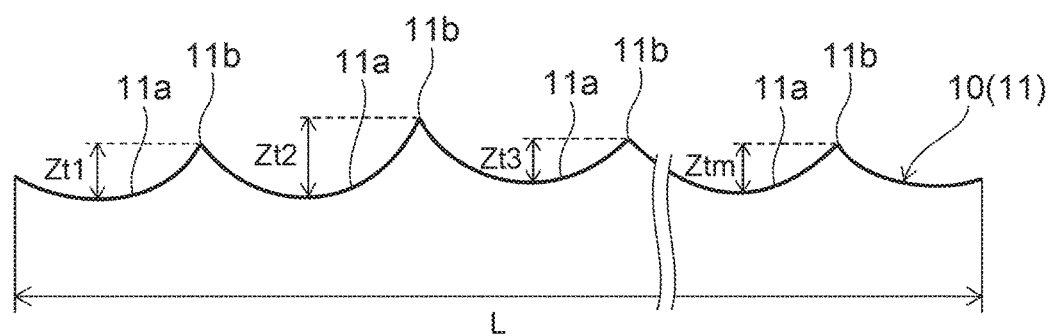
FIG. 3 is a schematic view illustrating an average height Rc of an unevenness.

FIG. 3 is a schematic view illustrating an average height Rc of an unevenness.

Although the average height Rc (Rc1) of the first unevenness 11 of the first layer 10 is described as an example in FIG. 3, an average height Rc2 of the second unevenness 21 of the second layer 20, an average height Rc3 of the third unevenness 31 of the third layer 30, and an average height Rc4 of the main part unevenness 41 of the main part 40 also can be calculated similarly to the average height Rc1 of the first unevenness 11.

As illustrated in FIG. 3, the average height Rc of the unevenness is the average value of a height Zti of each contour curve element along a reference length L and is represented by Formula (1) recited below. The "contour curve element" is one set of a recess and a protrusion that are next to each other. More specifically, for example, as illustrated in FIG. 3, the average height Rc is the average value of heights Zt1 to Ztm of m contour curve elements included within the reference length L, wherein the height Zti (e.g., Zt1, Zt2, Zt3, Ztm, etc.) of each contour curve element is the length in the stacking direction from the bottom of one recess 11a included in the first unevenness 11 of the first layer 10 to the apex of the protrusion 11b next to the recess 11a. The average height Rc conforms to JIS B 0601:2001.

[Formula 1]

$$R_c = \frac{1}{m}\sum_{i=1}^{m} Zti \quad (1)$$

Figure 4:
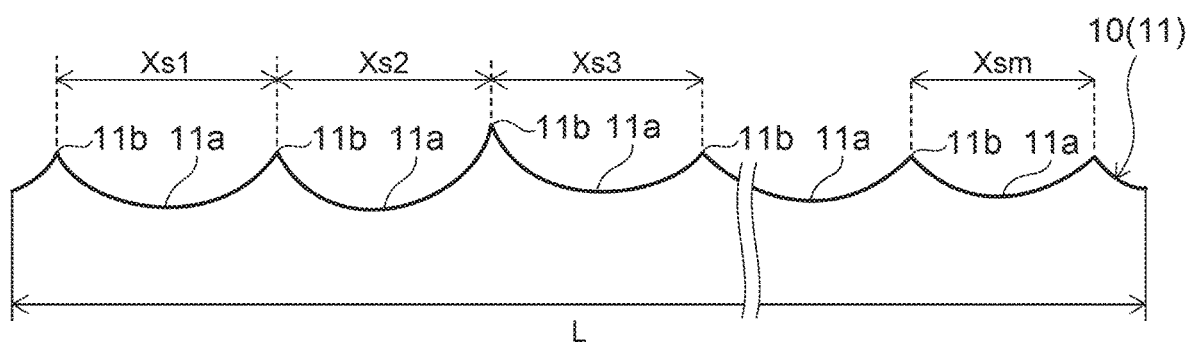
FIG. 4 is a schematic view illustrating an average length RSm of the unevenness.

FIG. 4 is a schematic view illustrating an average length RSm of the unevenness.

Although the average length RSm (RSm1) of the first unevenness 11 of the first layer 10 is described as an example in FIG. 4, an average length RSm2 of the second unevenness 21 of the second layer 20, an average length RSm3 of the third unevenness 31 of the third layer 30, and an average length RSm4 of the main part unevenness 41 of the main part 40 also can be calculated similarly to the average length RSm1 of the first unevenness 11.

As illustrated in FIG. 4, the average length RSm of the unevenness is the average value of a length Xsi of each contour curve element along the reference length L and is represented by Formula (2) recited below. More specifically, for example, as illustrated in FIG. 4, the average length RSm is the average value of lengths Xs1 to Xsm of m contour curve elements included within the reference length L, wherein the length Xsi (e.g., Xs1, Xs2, Xs3, etc.) of each contour curve element is the length in the measurement direction (a direction orthogonal to the stacking direction) from the apex of one protrusion 11b included in the first unevenness 11 of the first layer 10 to the apex of the protrusion 11b next to the protrusion 11b. The average length RSm conforms to JIS B 0601:2001.

[Formula 2]

$$RSm = \frac{1}{m}\sum_{i=1}^{m} Xsi \quad (2)$$

For example, the average height Rc of the unevenness and the average length RSm can be measured using the surface roughness tester SV-3200L4 manufactured by Mitutoyo.

The average height Rc1 of the first unevenness 11 is less than the average length RSm1 of the first unevenness 11. That is, the average value of the depths (the heights) of the multiple recesses 11a included in the first unevenness 11 is less than the average value of the widths of the multiple recesses 11a included in the first unevenness 11.

Thus, by setting the average height Rc1 of the first unevenness 11 to be less than the average length RSm1 of the first unevenness 11, the glossy appearance of the outer surface of the wet-area device 100 can be matted so as not to be too glossy, and the height of the unevenness of the outer surface of the wet-area device 100 can be prevented from becoming too large. Thereby, the adhesion of grime due to the unevenness can be suppressed while suppressing the glossy appearance of the outer surface by matting.

It is sufficient for the average height Rc1 of the first unevenness 11 to be less than the average length RSm1 of the first unevenness 11 for at least a portion of the first layer 10, and it is favorable for the average height Rc1 of the first unevenness 11 to be less than the average length RSm1 of the first unevenness 11 for the entire first layer 10. When the wet-area device 100 is a faucet apparatus, for example, it is favorable to perform matting so that the average height Rc1 of the first unevenness 11 is less than the average length RSm1 of the first unevenness 11 for the upper surface of the water discharger 101, the upper surface of the operation part 103, the front and side surfaces of the supporter 102, etc., that are easily viewable by the user.

The average height Rc1 of the first unevenness 11 is, for example, greater than 1 μm, and favorably greater than 1.3 μm and less than 5.7 μm. The average length RSm1 of the first unevenness 11 is, for example, not less than 60 μm and not more than 200 μm, and favorably greater than 93 μm and less than 126 μm. The ratio (Rc1/RSm1) of the average height Rc1 of the first unevenness 11 to the average length RSm1 of the first unevenness 11 is, for example, greater than 0.01 and less than 0.05.

By setting the average height Rc1 of the first unevenness 11 to be in this range, the height of the unevenness of the outer surface of the wet-area device 100 can be prevented from becoming too large or too small. Thereby, a moderate glossy appearance (gloss) can remain while suppressing the glossy appearance of the outer surface by matting.

It is favorable for the ratio (Rc1/RSm1) of the average height Rc1 of the first unevenness 11 to the average length RSm1 of the first unevenness 11 to be greater than 0.014 and less than 0.045, and more favorably not less than 0.015 and not more than 0.039.

By setting the ratio of the average height Rc1 of the first unevenness 11 to the average length RSm1 of the first unevenness 11 to be in this range, the height of the unevenness of the outer surface of the wet-area device 100 can be further prevented from becoming too large or too small. Thereby, an appearance that is both glossy and matte can be realized at the outer surface of the wet-area device 100.

As described above, the second unevenness 21 of the second layer 20 is along the first unevenness 11 of the first layer 10. The average height Rc2 of the second unevenness 21 is less than the average length RSm2 of the second unevenness 21. That is, the average value of the depths (the heights) of the multiple recesses 21a included in the second unevenness 21 is less than the average value of the widths of the multiple recesses 21a included in the second unevenness 21.

The average height Rc2 of the second unevenness 21 is, for example, greater than 1 μm, and favorably greater than 1.5 μm and less than 6.2 μm. The average length RSm2 of the second unevenness 21 is, for example, not less than 60 μm and not more than 200 μm, and favorably greater than 97 μm and less than 136 μm. The ratio (Rc2/RSm2) of the average height Rc2 of the second unevenness 21 to the average length RSm2 of the second unevenness 21 is, for example, greater than 0.01 and less than 0.05.

By setting the average height Rc2 of the second unevenness 21 to be in this range, the height of the unevenness of the outer surface of the wet-area device 100 can be prevented from becoming too large or too small. Thereby, a moderate glossy appearance (gloss) can remain while suppressing the glossy appearance of the outer surface by matting.

It is favorable for the ratio (Rc2/RSm2) of the average height Rc2 of the second unevenness 21 to the average length RSm2 of the second unevenness 21 to be greater than 0.015 and less than 0.046, and more favorably not less than 0.016 and not more than 0.038.

By setting the ratio of the average height Rc2 of the second unevenness 21 to the average length RSm2 of the second unevenness 21 to be in this range, the height of the unevenness of the outer surface of the wet-area device 100 can be further prevented from becoming too large or too small. Thereby, an appearance that is both glossy and matte can be realized at the outer surface of the wet-area device 100.

As described above, when the third layer 30 is provided, the third unevenness 31 of the third layer 30 is along the first unevenness 11 of the first layer 10. The average height Rc3 of the third unevenness 31 is less than the average length RSm3 of the third unevenness 31. That is, the average value of the depths (the heights) of the multiple recesses 31a included in the third unevenness 31 is less than the average value of the widths of the multiple recesses 31a included in the third unevenness 31.

The average height Rc3 of the third unevenness 31 is, for example, 1 μm or more, and favorably greater than 1.3 μm and less than 5.7 μm. The average length RSm3 of the third unevenness 31 is, for example, not less than 60 μm and not more than 200 μm, and favorably greater than 93 μm and less than 126 μm. The ratio (Rc3/RSm3) of the average height Rc3 of the third unevenness 31 to the average length RSm3 of the third unevenness 31 is, for example, greater than 0.01 and less than 0.05, and favorably greater than 0.014 and less than 0.045.

By setting the average height Rc3 of the third unevenness 31 to be in this range, the height of the unevenness of the outer surface of the wet-area device 100 can be prevented from becoming too large or too small when the third layer 30 is provided. Thereby, a moderate glossy appearance (gloss) can remain while suppressing the glossy appearance of the outer surface by matting.

As described above, when the main part unevenness 41 is provided in the main part 40, the main part unevenness 41 of the main part 40 is along the first unevenness 11 of the first layer 10. The average height Rc4 of the main part unevenness 41 is less than the average length RSm4 of the main part unevenness 41. That is, the average value of the depths (the heights) of the multiple recesses 41a included in the main part unevenness 41 is less than the average value of the widths of the multiple recesses 41a included in the main part unevenness 41.

The average height Rc4 of the main part unevenness 41 is, for example, 1 μm or more, and favorably greater than 1 μm and less than 6.3 μm. The average length RSm4 of the main part unevenness 41 is, for example, not less than 60 μm and not more than 200 μm, and favorably not less than 90 μm and not more than 150 μm. The ratio (Rc4/RSm4) of the average height Rc4 of the main part unevenness 41 to the average length RSm4 of the main part unevenness 41 is, for example, greater than 0.01 and less than 0.05.

The average height Rc1 of the first unevenness 11 is, for example, greater than the thickness T2 of the second layer 20 (referring to FIG. 2). Thus, by setting the average height Rc1 of the first unevenness 11 to be greater than the thickness T2 of the second layer 20, the second unevenness 21 can be formed better along the first unevenness 11. Thereby, it is easy to adjust the glossy appearance of the outer surface in a moderate range.

A method for manufacturing the wet-area device 100 according to the embodiment will now be described.

Figure 5A:
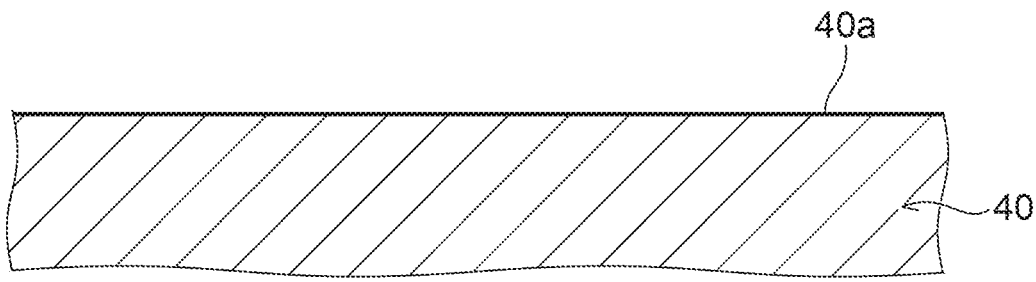
FIGS. 5A to 5C are cross-sectional views schematically illustrating the method for manufacturing the wet-area device according to the embodiment.
Figure 5B:
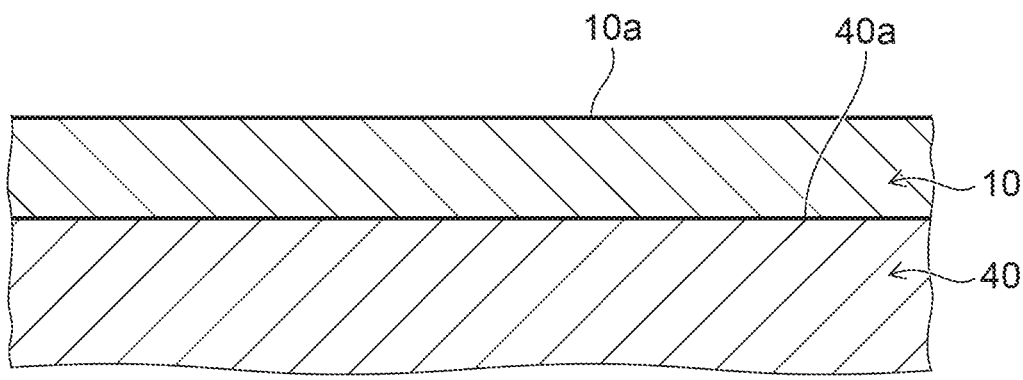
Figure 5C:
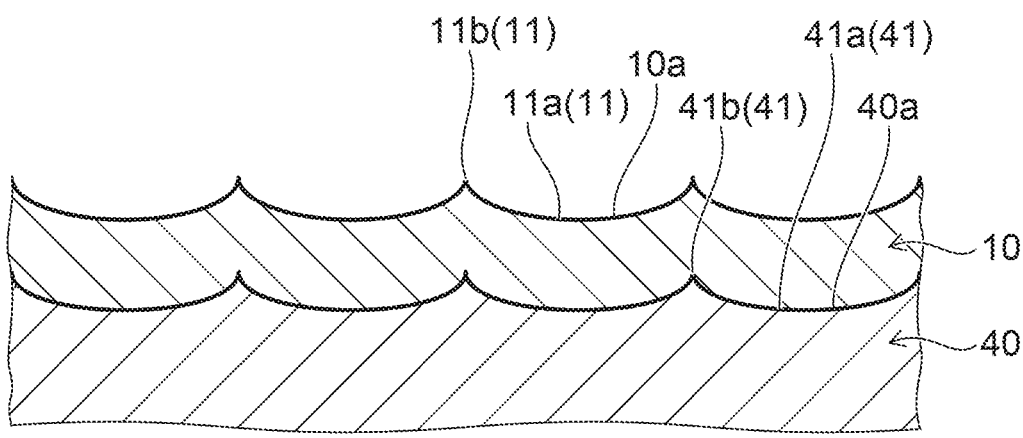

FIGS. 5A to 5C are cross-sectional views schematically illustrating the method for manufacturing the wet-area device according to the embodiment.

Figure 6A:
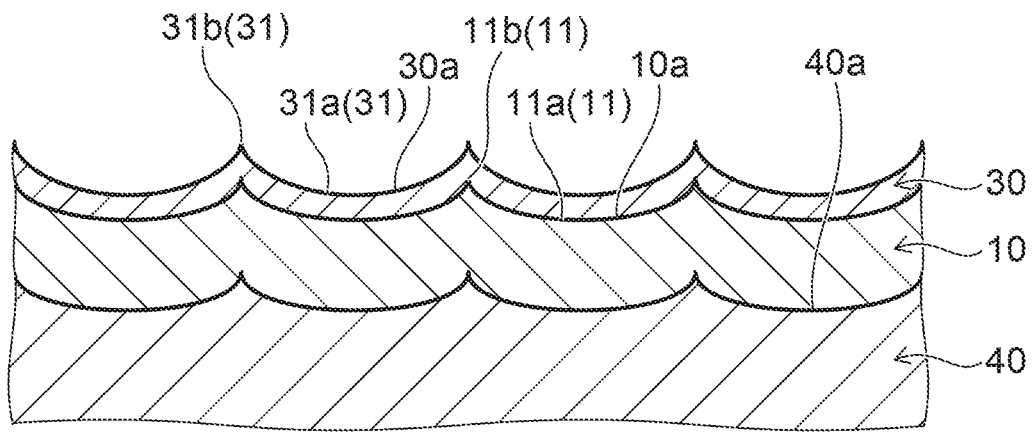
FIGS. 6A and 6B are cross-sectional views schematically illustrating the method for manufacturing the wet-area device according to the embodiment.
Figure 6B:
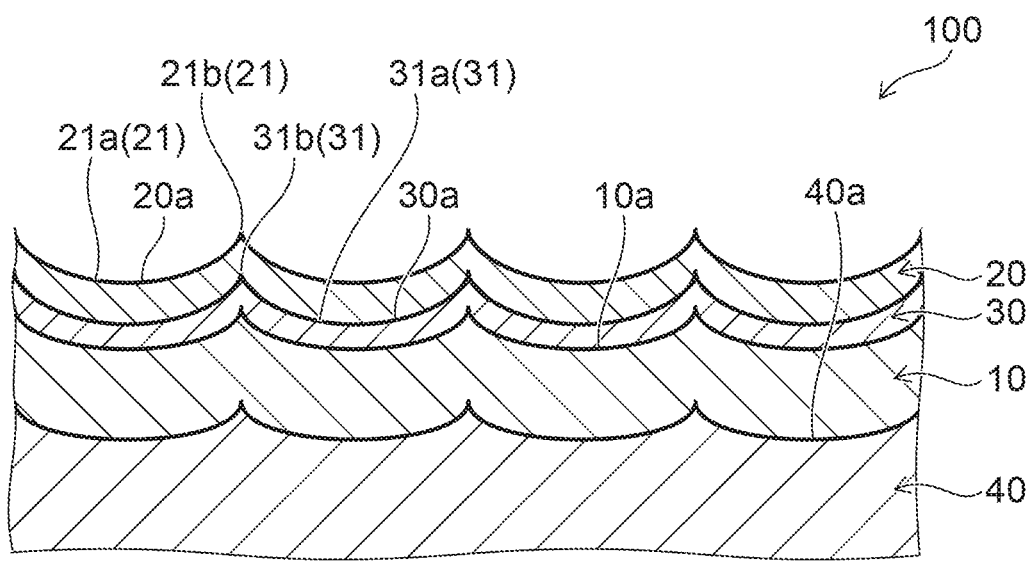

FIGS. 6A and 6B are cross-sectional views schematically illustrating the method for manufacturing the wet-area device according to the embodiment.

In the method for manufacturing the wet-area device according to the embodiment, first, the main part 40 that is made of metal is prepared as illustrated in FIG. 5A. Then, as illustrated in FIG. 5B, the first layer 10 is formed on the outer surface 40a of the main part 40 (a first layer formation process). For example, the first layer 10 is formed by electroplating, etc. When another layer is formed between the main part 40 and the first layer 10, the other layer may be formed on the outer surface 40a of the main part 40 before the first layer formation process.

Then, as illustrated in FIG. 5C, the first unevenness 11 that includes the multiple recesses 11a and the multiple protrusions 11b is formed in the outer surface 10a side of the first layer 10 by shot blasting the outer surface 10a of the first layer 10 (an unevenness formation process). In the unevenness formation process, the average height Rc1 of the first unevenness 11 is set to be less than the average length RSm1 of the first unevenness 11. For example, the average height Rc1 of the first unevenness 11 and the average length RSm1 can be adjusted by modifying the processing conditions of the shot blasting. More specifically, the average height Rc1 of the first unevenness 11 and the average length RSm1 can be adjusted by modifying the particle size of the blasting media (the grain) and/or the rate (the pressure of the air) at which the blasting media is projected.

When forming the first unevenness 11 in the first layer 10 in the unevenness formation process, there are cases where the main part unevenness 41 is formed in the outer surface 40a side of the main part 40 to include the multiple recesses 41a and the multiple protrusions 41b along the first unevenness 11. The main part unevenness 41 may not be formed in the main part 40 in the unevenness formation process.

Then, as illustrated in FIG. 6A, the third layer 30 is formed on the outer surface 10a of the first layer 10 in which the first unevenness 11 is formed (a third layer formation process). For example, the third layer 30 is formed by electroplating, etc. The third layer formation process forms the third layer 30 so that the third unevenness 31 includes the multiple recesses 31a and the multiple protrusions 31b and is formed along the first unevenness 11 in the outer surface 30a side of the third layer 30. The third layer formation process is performed as necessary and is omissible. When another layer is formed between the first layer 10 and the third layer 30, the other layer may be formed on the outer surface 10a of the first layer 10 after the first layer formation process and before the third layer formation process.

Continuing as illustrated in FIG. 6B, the second layer 20 that has a higher hardness than the first layer 10 is formed on the outer surface 30a of the third layer 30 (a second layer formation process). In the example, the second layer 20 includes chromium carbonitride and is formed by, for example, chemical vapor deposition (CVD), physical vapor deposition (PVD), sputtering, etc. The second layer formation process forms the second layer 20 so that the second unevenness 21 includes the multiple recesses 21a and the multiple protrusions 21b and is formed along the first unevenness 11 in the outer surface 20a side of the second layer 20. More specifically, for example, the second layer 20 is formed so that the thickness T2 of the second layer 20 is less than the thickness T1 of the first layer 10 and less than the average height Rc1 of the first unevenness 11. When another layer is formed between the third layer 30 and the second layer 20, the other layer may be formed on the outer surface 30a of the third layer 30 after the third layer formation process and before the second layer formation process.

Thus, by forming the first unevenness 11 in the first layer 10 and by forming the second unevenness 21 along the first unevenness 11 in the second layer 20, the glossy appearance of the outer surface of the wet-area device 100 can be matted so as not to be too glossy. When the third layer 30 is provided, the glossy appearance of the outer surface of the wet-area device 100 can be matted so as not to be too glossy by forming the third unevenness 31 along the first unevenness 11 in the third layer 30. By setting the average height Rc1 of the first unevenness 11 to be less than the average length RSm1 of the first unevenness 11, the glossy appearance of the outer surface of the wet-area device 100 can be matted so as not to be too glossy, and the height of the unevenness of the outer surface of the wet-area device 100 can be prevented from becoming too large. Thereby, a wet-area device can be provided in which the adhesion of grime due to the unevenness can be suppressed while suppressing the glossy appearance of the outer surface by matting.

As a means for forming the unevenness in the outermost surface of the wet-area device 100, for example, it may be considered to perform the unevenness formation process after the second layer formation process or the third layer formation process. However, there is a risk that cracks or the like may occur in the outer surface of the second layer 20 and/or the third layer 30 when shot blasting the second layer 20 and/or the third layer 30.

Therefore, in the embodiment, the unevenness formation process is performed after the first layer formation process and before the second layer formation process (before the third layer formation process). Thereby, the matting can be performed so that a moderate glossy appearance remains in the outer surface of the wet-area device 100 while suppressing the occurrence of cracks, etc., in the outer surface of the wet-area device 100.

The inventors performed the following experiment for the relationship between the appearance and the first and second unevennesses 11 and 21. In the experiment, first, samples 1 to 16 were prepared in which the first layer 10 that included nickel was formed on the outer surface 40a of the main part 40. Then, the first unevenness 11 was formed in the first layer 10 to have various average heights Rc and average lengths RSm by performing shot blasting with different processing conditions for each of the samples 1 to 16. After forming the first unevenness 11 in the first layer 10 for the samples 1 to 16, the average height Rc1 of the first unevenness 11, the average length RSm1, the ratio (Rc1/RSm1) of the average height Rc1 to the average length RSm1, and the glossiness were measured, and the existence of glossiness and matte in the appearance was determined by confirming the appearance with the naked eye. The results are shown in FIG. 7.

Then, for each of the samples 1 to 16, the third layer 30 that included chrome was formed on the outer surface 10a of the first layer 10 in which the first unevenness 11 was formed. Then, the second layer 20 that included chromium carbonitride was formed by PVD on the outer surface 30a of the third layer 30 for each of the samples 1 to 16. After forming the second layer 20 for the samples 1 to 16, the average height Rc2 of the second unevenness 21, the average length RSm2, the ratio (Rc2/RSm2) of the average height Rc2 to the average length RSm2, and the glossiness were measured, and the existence of glossiness and matte in the appearance was determined by confirming the appearance with the naked eye. The results are shown in FIG. 8.

FIGS. 7 and 8 are tables illustrating the experiment results.

For the appearance in FIGS. 7 and 8, "o" indicates an appearance that is both glossy and matte (glossy-matte), and "x" indicates a non-matte appearance (non-matte) or a non-glossy appearance (non-glossy matte).

As illustrated in FIGS. 7 and 8, in the samples 1 to 4, the ratio (Rc1/RSm1) of the average height Rc1 to the average length RSm1 of the first unevenness 11 was 0.005 to 0.014, and the ratio (Rc2/RSm2) of the average height Rc2 to the average length RSm2 of the second unevenness 21 was 0.005 to 0.015. The appearances of the samples 1 to 4 after the second layer 20 was formed were "non-matte", in which the appearance was glossy but was without matte.

As illustrated in FIGS. 7 and 8, in the samples 12 to 16, the ratio (Rc1/RSm1) of the average height Rc1 to the average length RSm1 of the first unevenness 11 was 0.045 to 0.082, and the ratio (Rc2/RSm2) of the average height Rc2 to the average length RSm2 of the second unevenness 21 was 0.046 to 0.090. The appearances of the samples 12 to 16 after the second layer 20 was formed were "non-glossy matte", in which the appearance was matte but had no gloss.

Conversely, as illustrated in FIGS. 7 and 8, in the samples 5 to 11, the ratio (Rc1/RSm1) of the average height Rc1 to the average length RSm1 of the first unevenness 11 was 0.015 to 0.039 (greater than 0.014 and less than 0.045), and the ratio (Rc2/RSm2) of the average height Rc2 to the average length RSm2 of the second unevenness 21 was 0.016 to 0.038 (greater than 0.015 and less than 0.046). The appearances of the samples 5 to 11 after the second layer 20 was formed were "glossy-matte", in which an appearance that is both glossy and matte existed.

According to the embodiments as described above, a wet-area device and a method for manufacturing a wet-area device can be provided in which the adhesion of grime due to the unevenness can be suppressed while suppressing the glossy appearance of the outer surface by matting.

Hereinabove, embodiments of the invention are described. However, the invention is not limited to these descriptions. Appropriate design modifications made by one skilled in the art for the embodiments described above also are within the scope of the invention to the extent that the features of the invention are included. For example, the configurations, the dimensions, the materials, the arrangements, the mounting methods, etc., of the components included in the wet-area device are not limited to those illustrated and can be modified appropriately.

Also, the components included in the embodiments described above can be combined within the limits of technical feasibility; and such combinations are within the scope of the invention to the extent that the features of the invention are included.

What is claimed is:

1. A wet-area device, comprising:
a main part made of metal;
a first layer provided on an outer surface of the main part; and
a second layer provided on an outer surface of the first layer,
a hardness of the second layer being greater than a hardness of the first layer,
the first layer including a first unevenness at a side of the outer surface of the first layer, the first unevenness including a plurality of first recesses and a plurality of first protrusions,
the second layer including a second unevenness at a side of an outer surface of the second layer, the second unevenness including a plurality of second recesses and a plurality of second protrusions and being arranged along the first unevenness,
an average height of the first unevenness being less than an average length of the first unevenness,
the average height of the first unevenness being greater than 1.3 μm and less than 5.7 μm, and
a ratio of the average height of the first unevenness to the average length of the first unevenness being greater than 0.01 and less than 0.05.

2. The device according to claim 1, wherein
the ratio of the average height of the first unevenness to the average length of the first unevenness is greater than 0.014 and less than 0.045.

3. The device according to claim 2, wherein
the ratio of the average height of the first unevenness to the average length of the first unevenness is not less than 0.015 and not more than 0.039.

4. The device according to claim 1, wherein
an average height of the second unevenness is greater than 1 μm, and
a ratio of the average height of the second unevenness to an average length of the second unevenness is greater than 0.01 and less than 0.05.

5. The device according to claim 4, wherein
the ratio of the average height of the second unevenness to the average length of the second unevenness is greater than 0.015 and less than 0.046.

6. The device according to claim 5, wherein
the ratio of the average height of the second unevenness to the average length of the second unevenness is not less than 0.016 and not more than 0.038.

7. The device according to claim 1, wherein
a thickness of the second layer is less than a thickness of the first layer.

8. The device according to claim 7, wherein
the average height of the first unevenness is greater than the thickness of the second layer.

9. A method for manufacturing the wet-area device according to claim 1, the method comprising:

a first layer formation process of forming the first layer on the outer surface of the main part made of metal;

an unevenness formation process of forming the first unevenness at the side of the outer surface of the first layer by shot blasting the outer surface of the first layer, the first unevenness including the plurality of first recesses and the plurality of first protrusions; and a second layer formation process of forming the second layer on the outer surface of the first layer where the first unevenness is formed, the second layer having a higher hardness than the first layer, an average height of the first unevenness being less than an average length of the first unevenness in the unevenness formation process, the second layer formation process forming the second layer so that the second unevenness includes the plurality of second recesses and the plurality of second protrusions and is arranged along the first unevenness at the side of the outer surface of the second layer.

\* \* \* \* \*